(12) United States Patent  
Kunii

(10) Patent No.: US 8,712,406 B2  
(45) Date of Patent: Apr. 29, 2014

(54) COMMUNICATION APPARATUS AND COMMUNICATION SYSTEM

(75) Inventor: Tadahiro Kunii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1193 days.

(21) Appl. No.: 12/035,365

(22) Filed: Feb. 21, 2008

(65) Prior Publication Data

US 2008/0207231 A1   Aug. 28, 2008

(30) Foreign Application Priority Data

Feb. 28, 2007   (JP) .................................. 2007-050463

(51) Int. Cl.  
*H04W 4/00* (2009.01)

(52) U.S. Cl.  
USPC ..................................... 455/426.1; 455/426.2

(58) Field of Classification Search  
CPC .......................................................... H04B 3/23  
USPC ........................................ 455/426.1; 370/338  
See application file for complete search history.

(56) References Cited

U.S. PATENT DOCUMENTS

| 7,016,395 | B2 | 3/2006 | Watanabe et al. |
| 7,263,074 | B2 * | 8/2007 | LeBlanc ........................ 370/286 |
| 7,899,396 | B2 * | 3/2011 | Meylan et al. ............... 455/41.2 |
| 2003/0219002 | A1 * | 11/2003 | Kishida ......................... 370/338 |
| 2006/0246866 | A1 | 11/2006 | Nakagawa et al. | |
| 2008/0123610 | A1 * | 5/2008 | Desai et al. ................... 370/339 |

FOREIGN PATENT DOCUMENTS

| CN | 1130973 A | 9/1996 |
| JP | H10-285074 A | 10/1998 |
| JP | 2002198868 A | 7/2002 |
| JP | 2003018170 A | 1/2003 |
| JP | 2006-311109 A | 11/2006 |
| WO | 9507595 A1 | 3/1995 |

OTHER PUBLICATIONS

Japan Patent Office; Notification of Reason for Refusal in Japanese Patent Application No. 2007-050463 mailed Feb. 10, 2009.  
The State Intellectual Property Office of the People's Republic of China; Notification of First Office Action in Chinese Patent Application No. 200810082048.6 mailed Apr. 6, 2010.

* cited by examiner

*Primary Examiner* — Christopher M Brandt  
*Assistant Examiner* — Muthuswamy Manoharan  
(74) *Attorney, Agent, or Firm* — Baker Botts L.L.P.

(57) ABSTRACT

There is disclosed a communication apparatus including a first communication portion, a second communication portion, a speech detecting portion, and a communication control portion. The first communication portion wirelessly sends and receives audio data to and from a first other communication apparatus. The second communication portion wirelessly sends and receives general data to and from a second other communication apparatus. The speech detecting portion detects that a user at the first other communication apparatus is speaking. The communication control portion interrupts the wireless communication implemented by the second communication portion when the user at the first other communication apparatus is speaking.

4 Claims, 11 Drawing Sheets

COMMUNICATION APPARATUS AND COMMUNICATION SYSTEM

CROSS REFERENCE TO RELATED APPLICATION

The present application claims priority from Japanese Patent Application No. 2007-050463, which was filed on Feb. 28, 2007, the disclosure of which is herein incorporated by reference in its entity.

BACKGROUND OF THE INVENTION

1. Field of the Invention

The present invention relates to a communication apparatus and a communication system, and particularly to a communication apparatus and a communication system which can maintain an excellent quality of a wireless communication implemented by a first communication portion while ensuring a communication time for a wireless communication implemented by a second communication portion.

2. Description of Related Art

There is known a communication apparatus that simultaneously makes communications with a plurality of other communication apparatuses by respective wireless communication methods and by using a same frequency band. This communication apparatus suffers from a radio interference since the communications by the respective communication methods are made by using the same frequency band. The radio interference may degrade the qualities of the communications.

JP-A-2003-18170 (see paragraph [0017]) discloses a technique for inhibiting the radio interference so as to maintain excellent qualities of the communications. That is, according to this publication, while a communication apparatus (hereinafter referred to as "communication apparatus X") is wirelessly communicating with a first other communication apparatus and a second other communication apparatus simultaneously, by means of a carrier wave of a first wireless channel and by means of a carrier wave of a second wireless channel, respectively, when one (hereinafter referred to as "communication apparatus Y") of the first and second other communication apparatuses detects that the carrier of the communication between the communication apparatus X and the other (hereinafter referred to as "communication apparatus Z") of the first and second other communication apparatuses uses a same wireless channel as used by the carrier of the communication between the communication apparatus X and itself (i.e., the communication apparatus Y) and notifies this fact to the communication apparatus X, the communication apparatus X ceases the communication with the communication apparatus Z.

According to this technique, regardless of whether the communication between the communication apparatuses X and Z is still desired or not, the communication therebetween is ceased when the above-described condition is satisfied.

On the other hand, if the communication between the communication apparatuses X and Z is not ceased, a radio interference occurs. In this case, a problem arises, which will be described with reference to FIG. 11 schematically illustrating a wireless communication environment of the communication apparatus X.

That is, the communication apparatus X has a housing that accommodates (i) a digital cordless communication portion 101 as a wireless communication module used when the communication apparatus X functions as a base unit of a digital cordless telephone system to wirelessly communicate with a cordless handset Y, and (ii) a wireless LAN communication portion 102 as a communication module used when the communication apparatus X wirelessly communicates with a PC 105 via an access point Z.

When the communication apparatus X is wirelessly communicating with both the cordless handset Y and the PC 105, the digital cordless communication portion 101 suffers from a radio interference K1 from the access point Z and a radio interference K3 from the wireless LAN communication portion 102. On the other hand, the cordless handset Y suffers from a radio interference K2 from the access point Z and a radio interference K4 from the wireless LAN communication portion 102.

Generally, the digital cordless communication portion 101 more seriously suffers from radio interference than the cordless handset Y does, for the following reason.

That is, the digital cordless communication portion 101 is disposed in the same housing as the wireless LAN communication portion 102 is, and generally a distance L1 between the digital cordless communication portion 101 and the wireless LAN communication portion 102 is considerably smaller than a distance L2 between the digital cordless communication portion 101 and the cordless handset Y and a distance L3 between the wireless LAN communication portion 102 and the access point Z. Hence, the radio interference K3 from the wireless LAN communication portion 102 that the digital cordless communication portion 101 suffers from is relatively strong. Thus, the digital cordless communication portion 101 more tends to suffer from radio interference than the cordless handset Y does.

Hence, while the digital cordless communication portion 101 of the communication apparatus X and the cordless handset Y wirelessly communicate with each other, a communication D2 from the cordless handset Y to the digital cordless communication portion 101 is more susceptible to radio interference than a communication D1 from the digital cordless communication portion 101 to the cordless handset Y. Thus, the quality of the communication D2 from the cordless handset Y to the digital cordless communication portion 101 tends to be relatively poor in comparison with that of the communication D1 from the digital cordless communication portion 101 to the cordless handset Y.

SUMMARY OF THE INVENTION

This invention has been developed in view of the above-described situations, and it is an object of the invention, therefore, to provide a communication apparatus and a communication system which can maintain an excellent quality of a wireless communication implemented by a first communication portion while ensuring a communication time for a wireless communication implemented by a second communication portion.

This object may be achieved according to any one of the following modes of the present invention in the form of a communication apparatus and a communication system, each of which is numbered like the appended claims and depends from the other mode or modes, where appropriate, to indicate and clarify possible combinations of elements or technical features. It is to be understood that the invention is not limited to the technical features or any combinations thereof which will be described for illustrative purpose only. That is, the language of each mode is to be construed by taking account of the related art, the explanatory description following the description of the mode, and the description of embodiments of the invention provided below. As long as the language of the mode is construed in such a way, a further element or feature or elements or features may be added to the mode, or some of the elements or features described with respect to the mode may be omitted.

(1) A communication apparatus including (a) a first communication portion which wirelessly sends and receives audio data to and from a first other communication apparatus by using a frequency channel within a frequency band, (b) a second communication portion which wirelessly sends and receives general data to and from a second other communication apparatus by using a frequency channel within the frequency band, (c) a speech detecting portion which detects, on the basis of the audio data received from the first other communication apparatus, that a user at the first other communication apparatus is speaking, and (d) a communication control portion which interrupts the wireless communication implemented by the second communication portion when it is detected by the speech detecting portion that the user at the first other communication apparatus is speaking, the communication control portion not interrupting the wireless communication implemented by the second communication portion when it is not detected by the speech detecting portion that the user at the first other communication apparatus is speaking.

The term "general data" in the above description of the mode (1) is used to mean any kind of data, in contrast to the audio data. Thus, the general data includes data other than audio data, such as image data, but does not exclude audio data.

According to the communication apparatus, while the first communication portion wirelessly communicates with the first other communication apparatus to send and receive audio data, when it is detected by the speech detecting portion that the user at the first other communication apparatus is speaking, the wireless communication being implemented by the second communication portion is interrupted. On the other hand, when it is not detected that the user at the first other communication apparatus is speaking, the wireless communication being implemented by the second communication portion is not interrupted. Hence, it is enabled to ensure a communication time for the wireless communication implemented by the second communication portion while maintaining an excellent quality of the wireless communication implemented by the first communication portion.

Generally, a distance between the first and second communication portions is smaller than a distance between the first other communication apparatus and the second communication portion. Hence, when the first communication portion and the first other communication apparatus are wirelessly communicating with each other, transmission of audio data from the first other communication apparatus to the first communication portion is affected by a radio interference from the second communication portion more strongly than transmission of audio data from the first communication portion to the first other communication apparatus is, thereby lowering the quality of the communication of audio data from the first other communication apparatus to the first communication portion.

In view of this, while both the first and second communication portions implement respective wireless communications, when the user at the first other communication apparatus is speaking, that is, when audio data is sent from the first other communication apparatus to the first communication portion, the wireless communication by the second communication portion is interrupted so as to inhibit the above-described radio interference from the second communication portion, thereby maintaining an excellent quality of the communication implemented by the first communication portion. On the other hand, when the user at the first other communication apparatus is not speaking, that is, when audio data is not sent from the first other communication apparatus to the first communication portion, the radio interference from the second communication portion does not much affect the communication between the first communication portion and the first other communication apparatus, and thus the wireless communication by the second communication portion is not interrupted, thereby ensuring a communication time for the wireless communication implemented by the second communication portion.

(2) The communication apparatus according to the mode (1), wherein the speech detecting portion includes a received-audio-level detecting portion which detects a sound volume of the audio data sent from the first other communication apparatus to the first communication portion. The speech detecting portion detects that the user is speaking, on the basis of the sound volume detected by the received-audio-level detecting portion, such that it is determined that it is detected that the user is speaking when the sound volume detected by the received-audio-level detecting portion is equal to or higher than a first predetermined threshold, and that it is not detected that the user is speaking when the sound volume detected by the received-audio-level detecting portion is lower than the first predetermined threshold.

According to the communication apparatus of the mode (2), the fact that the user at the first other communication apparatus is speaking is detected on the basis of the sound volume of the audio data sent from the first other communication apparatus to the first communication portion. Hence, it is easily and accurately detectable that the user at the first other communication apparatus is speaking.

(3) The communication apparatus according to the mode (1), wherein the speech detecting portion includes a sent-audio-level detecting portion which detects a sound volume of the audio data sent from the first communication portion to the first other communication apparatus, the speech detecting portion detecting that the user is speaking, on the basis of the sound volume detected by the sent-audio-level detecting portion, such that it is determined that it is not detected that the user is speaking when the sound volume detected by the sent-audio-level detecting portion is equal to or higher than a second predetermined threshold.

According to the communication apparatus of the mode (3), the sound volume of the audio data sent from the first communication portion to the first other communication apparatus is detected. When the detected sound volume is equal to or higher than the second predetermined threshold, it is determined that it is not detected that the user at the first other communication apparatus is speaking, and the wireless communication by the second communication portion is not interrupted.

That is, when it is detected that the sound volume of the audio data sent from the first communication portion to the first other communication portion is equal to or higher than the second predetermined threshold, a user at the communication apparatus of the mode (3) who is making a speech communication with the user at the first other communication apparatus is speaking even if the user at the first other communication apparatus is also speaking. Hence, it can be considered that the user at the communication apparatus of the mode (3) does not intend to listen to the speech of the user at the first other communication apparatus. In this case, even where the user at the communication apparatus of the mode (3) can not clearly hear the speech of the user at the first other communication apparatus due to the radio interference from the second communication portion, the communication between the two users is not seriously affected thereby, and thus the wireless communication by the second communication portion is not interrupted, so as to ensure a communication time for the wireless communication by the second communication portion.

(4) The communication apparatus according to the mode (3), wherein the speech detecting portion detects that the user is speaking, on the basis of the sound volume detected by the sent-audio-level detecting portion, such that it is determined that it is detected that the user is speaking when at least the sound volume detected by the sent-audio-level detecting portion is lower than the second predetermined threshold.

(5) The communication apparatus according to the mode (1), wherein the speech detecting portion includes a received-audio-level detecting portion which detects a sound volume of the audio data sent from the first other communication apparatus to the first communication portion, and a sent-audio-level detecting portion which detects a sound volume of the audio data sent from the first communication portion to the first other communication apparatus, the speech detecting portion detecting that the user is speaking, on the basis of the sound volumes respectively detected by the received-audio-level detecting portion and the sent-audio-level detecting portion, such that it is determined that it is detected that the user is speaking when the sound volume detected by the received-audio-level detecting portion is equal to or higher than the sound volume detected by the sent-audio-level detecting portion, and that it is not detected that the user is speaking when the sound volume detected by the received-audio-level detecting portion is lower than the sound volume detected by the sent-audio-level detecting portion.

According to the communication apparatus of the mode (5), the fact that the user at the first other communication apparatus is speaking is detected on the basis of a result of a comparison between the sound volume of the audio data (which will be referred to as "received audio data") received by the communication apparatus of the mode (5) from the first other communication apparatus and the sound volume of the audio data (which will be referred to as "sent audio data") sent from the communication apparatus of the mode (5) to the first other communication apparatus. That is, when the result of the comparison indicates that the sound volume of the received audio data is equal to or higher than that of the sent audio data, it is determined that it is detected that the user at the first other communication apparatus is speaking, and when the result of the comparison indicates that the sound volume of the received audio data is lower than that of the sent audio data, it is determined that it is not detected that the user at the first other communication apparatus is speaking. In the former case, the wireless communication by the second communication portion is interrupted, and in the latter case, the wireless communication by the second communication portion is not interrupted.

When the sound volume of the received audio data is equal to or higher than that of the sent audio data, it is highly probable that the user at the first other communication apparatus desires to be listened to. Hence, in such a case, the wireless communication by the second communication portion is interrupted, so as to maintain the excellent quality of the speech communication between the first communication portion and the first other communication apparatus.

On the other hand, when the sound volume of the received audio data is lower than that of the sent audio data, it can be considered that the user at the communication apparatus of the mode (5) talking with the user at the first other communication apparatus currently does not intend to listen to the speech of the user at the first other communication apparatus. In this case, even where the user at the communication apparatus of the mode (5) can not clearly hear the speech of the user at the first other communication apparatus due to the radio interference from the second communication portion, the communication between the two users is not seriously affected thereby, and thus the wireless communication by the second communication portion is not interrupted. Hence, the communication apparatus of the mode (5) further ensures a communication time for the wireless communication by the second communication portion in comparison with the communication apparatuses of the modes (2) and (3).

(6) The communication apparatus according to the mode (5), wherein the speech detecting portion further includes a comparing portion which compares the sound volume detected by the received-audio-level detecting portion with the sound volume detected by the sent-audio-level detecting portion, the speech detecting portion detecting that the user is speaking, on the basis of a result of the comparison between the sound volumes, such that it is determined that it is detected that the user is speaking when the result indicates that the sound volume detected by the received-audio-level detecting portion is equal to or higher than the sound volume detected by the sent-audio-level detecting portion, and that it is not detected that the user is speaking when the result indicates that sound volume detected by the received-audio-level detecting portion is lower than the sound volume detected by the sent-audio-level detecting portion.

(7) The communication apparatus according to the mode (1), wherein the speech detecting portion includes a received-audio-level detecting portion which detects a sound volume of the audio data sent from the first other communication apparatus to the first communication portion, and a sent-audio-level detecting portion which detects a sound volume of the audio data sent from the first communication portion to the first other communication apparatus, the speech detecting portion detecting that the user is speaking, on the basis of the sound volumes respectively detected by the received-audio-level detecting portion and the sent-audio-level detecting portion, such that it is determined that it is detected that the user is speaking when the sound volume detected by the received-audio-level detecting portion is higher than the sound volume detected by the sent-audio-level detecting portion by an amount equal to or larger than a first predetermined amount.

As described above, according to the communication apparatus of the mode (5), it is determined that it is detected that the user at the first other communication apparatus is speaking, when the sound volume of the received audio data is equal to or higher than that of the sent audio data. In contrast, according to the communication apparatus of the mode (7), it is not determined that it is detected that the user at the first other communication apparatus is speaking, unless the sound volume of the received audio data is larger than that of the sent audio data by an amount larger than the first predetermined amount. Hence, according to the communication apparatus of the mode (7), it is less often detected that the user at the first other communication apparatus is speaking than that of the mode (5), and accordingly the communication time of the wireless communication by the second communication portion is further ensured.

(8) The communication apparatus according to the mode (1), wherein the speech detecting portion includes a received-audio-level detecting portion which detects a sound volume of the audio data sent from the first other communication apparatus to the first communication portion, and a sent-audio-level detecting portion which detects a sound volume of the audio data sent from the first communication portion to the first other communication apparatus, the speech detecting portion detecting that the user is speaking, on the basis of the sound volumes respectively detected by the received-audio-level detecting portion and the sent-audio-level detecting portion, such that it is determined that it is detected that the user is speaking when the sound volume detected by the received-audio-level detecting portion is larger than a value obtained by subtracting a second predetermined amount from the sound volume detected by the sent-audio-level detecting portion.

According to the communication apparatus of the mode (5) described above, it is determined that it is detected that the user at the first other communication apparatus is speaking, when the sound volume of the received audio data is equal to or higher than that of the sent audio data. In contrast, according to the communication apparatus of the mode (8), it is determined that it is detected that the user at the first other communication apparatus is speaking, even when the sound volume of the received audio data is lower than that of the sent audio data as long as the difference between the sound volumes of the first and sent audio data is equal to or lower than the second predetermined amount. Hence, it is more often detected that the user at the first other communication apparatus is speaking in comparison with the communication apparatus of the mode (5), and accordingly the excellent quality of the wireless communication by the first communication portion is more stably maintained.

(9) The communication apparatus according to any one of the modes (1)-(8), further including a communication resuming portion which resumes the wireless communication by the second communication portion when it becomes not to be detected by the speech detecting portion that the user is speaking after the interruption of the wireless communication.

(10) A communication system including a base unit and a cordless handset at least one of which is constituted by the communication apparatus according to any one of the modes (1)-(9).

According to the communication system of the mode (10), at least one of the base unit and the cordless handset enjoys the effect described above with respect to any one of the modes (1)-(9).

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described presently preferred embodiments of the invention, by referring to the accompanying drawings.

Figure 1:
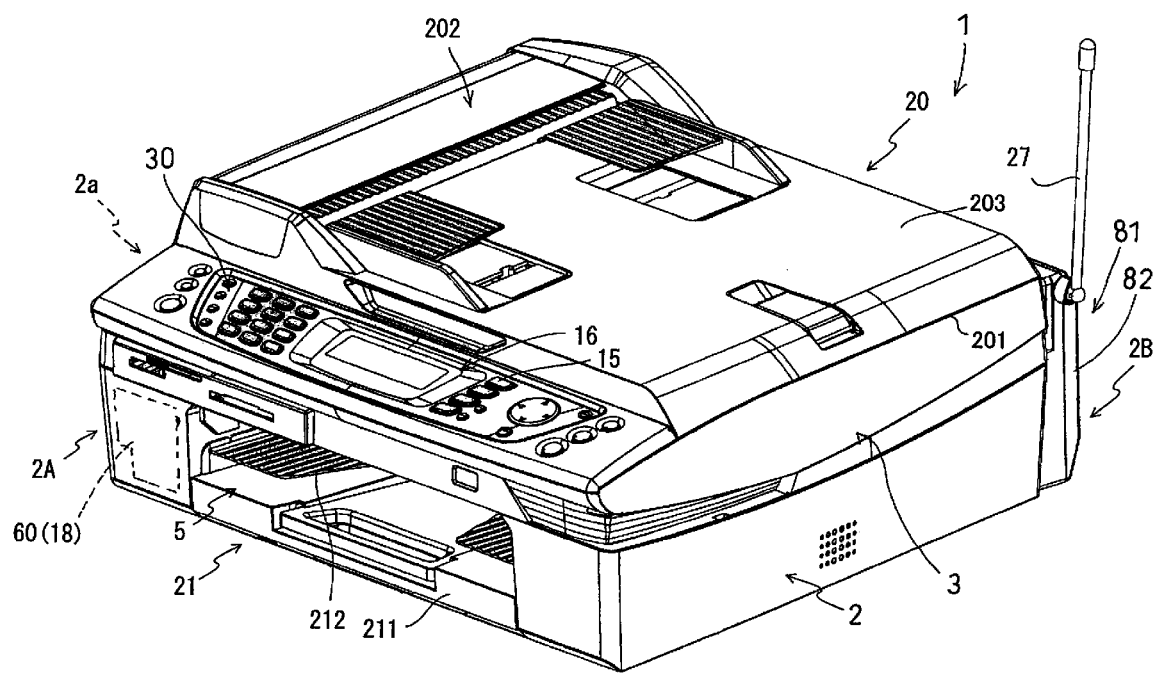
FIG. 1 is an external view of a MFP including a communication apparatus according to a first embodiment of the invention.

Initially, a multifunction peripheral apparatus (hereinafter referred to as MFP) 1 including a communication apparatus according to a first embodiment of the invention will be described with reference to FIGS. 1 and 2. FIG. 1 is an external view of the MFP 1.

The MFP 1 has various functions such as speech communication function, facsimile function, printer function, scanner function, and copy function. In this embodiment, the MFP 1 takes the form of a base unit of a digital cordless telephone system, and is used mainly for a speech communication with a digital cordless handset 31 (shown in FIG. 3) of the digital cordless telephone system and an external apparatus (not shown) connected with the digital cordless telephone system via a telephone line network 100 (shown in FIG. 3). The MFP 1 can also function as a communication apparatus capable of data communication with an access point 62 (shown in FIG. 3) by a wireless communication method defined in wireless LAN standards.

As shown in FIG. 1, the MFP 1 includes a main housing 2 and an upper housing 3. The main housing 2 is box-shaped and open on the upper side. The upper housing 3 is attached to the main housing 2 at a lateral side (i.e., at the left-hand side as seen in FIG. 1) to be vertically movable with respect to the main housing 2 such that the upper housing 3 is turned around a pivot shaft portion (not shown) such as hinge or hinge portion. The main housing 2 and the upper housing 3 are formed of synthetic resin by injection molding.

At a front side of the upper housing 3 (i.e., the lower side as seen in FIG. 1), an operation panel 30 is disposed. The operation panel 30 includes a manual operation portion 15 having numerical buttons, a communication start button, a function button, and others. A user manipulates the first manual operation portion 15 to turn on/off the MFP 1, select a function to be implemented, and input various instructions.

The operation panel 30 further includes a first display portion 16 that may be a liquid crystal display (LCD). On the first display portion 16 are presented a menu, the operation status of the MFP 1, and others, in response to a manipulation of the first manual operation portion 15. That is, the user manipulates the manual manipulation portion 15 to have information corresponding to the manipulation be presented on the first display portion 16. Thus, the user can view various kinds of information such as the communication status between the MFP 1 and the access point 62 and that between the MFP 1 and the cordless handset 31.

In the upper housing 3, a scanner portion 20 is disposed on the rear side (i.e., on the upper side as seen in FIG. 1) of the operation panel 30. The scanner portion 20 includes a document reading table 201 functioning as a FBS (Flatbed Scanner), and a document cover 203 having an ADF (Auto Document Feeder) 202. The document cover 203 is attached to the document reading table 201 at the rear side of the MFP 1 by means of a hinge (not shown) such that the document cover 203 is movable or openable/closable relative to the document reading table 201. Although not shown, a platen glass is disposed at an upper surface of the document reading table 201, and an image reading unit is disposed inside the document reading table 201.

On the other hand, in the main housing 2 is disposed a printer portion 21, which is an image recording apparatus of inkjet type that records an image on a recording sheet by selectively ejecting ink droplets on the basis of image data read by the scanner portion 20 or inputted from an external device. It is noted, however, that the image recording apparatus or the printer portion may not be of inkjet type, but various other recording methods such as electrophotography or thermal transfer can be employed as a method of image recording.

At the front side of the MFP 1 or of the printer portion 21, an opening 5 is formed. In the opening 5 is extractably inserted a sheet supply cassette 211, on which a plurality of recording sheets are stacked. Over the sheet supply cassette 211 is disposed a sheet catch tray 212 onto which a recording sheet on which an image has been recorded is ejected.

Inside the main housing 2 and inside the printer portion 21, a sheet feed path extends upward from a rear side of the sheet supply cassette 211 and then turns frontward in a U-like shape to be connected to the sheet catch tray 212. In the printer portion 2, a sheet supply unit and a printhead (neither shown) are also disposed. The sheet supply unit supplies or picks up the recording sheets one by one from the rear side of the sheet supply cassette 211. The printhead is disposed in the sheet feed path and ejects ink droplets onto a surface of the recording sheet being fed along the sheet feed path to record an image.

On a left side wall 2a of the main housing 2, a base handset 24 (shown in FIG. 3) and a support portion (not shown) that supports the base handset 24 while the MFP 1 is in a standby mode are disposed, so as to enable a speech communication with the cordless handset 31 or with an external apparatus through the telephone line network 100. Thus, the MFP 1 is constituted by a main body and the support portion A wireless communication unit 81 is attached to a right rear end portion of the main housing 2. The wireless communication unit 81 includes a casing 82 of synthetic resin, and accommodates a communication board (not shown) including a first digital-cordless-communication control portion 26 (shown in FIG. 3), detailed description of which will be provided later. In brief, the first digital-cordless-communication control portion 26 wirelessly connects the base handset 24 of the MFP 1 as the base unit to the cordless handset 31 as another handset located at a position remote from the MFP 1, and has a first cordless-phone antenna 27 protruding from the casing 82 to transmit and receive signals.

As described above, the MFP 1 has the base handset 24 attached to the MFP 1 as the base unit, and the wireless communication unit 81 that wirelessly connects the base handset 24 to the cordless telephone 31. Thus, the base handset 24 and the cordless handset 31 are selectively used as desired, and further a communication can be made between the base handset 24 and the cordless handset 31.

The main housing 2 has four corners including a corner 2A and a corner 2B that are opposed to each other. A wireless communication unit board (or a wireless LAN board) 60 including a wireless LAN communication control portion 18 (shown in FIG. 3), and a main circuit board (not shown) for electrically controlling operations of devices included in the MFP 1, are disposed inside the corner 2A. The wireless communication unit 81 accommodating the communication board including the first digital-cordless-communication control portion 26 is attached to the corner 2B.

According to the MFP 1, the main circuit board the wireless LAN board 60 including the wireless LAN communication control portion 18 and the main circuit board are disposed apart from the wireless communication unit 81 accommodating the communication board including the first digital-cordless-communication control portion 26, as described above. Thus, the wireless LAN board 60 including the wireless LAN communication control portion 18, the communication board including the first digital-cordless-communication control portion 26, and the main circuit board do not tend to suffer from noise.

Figure 2:
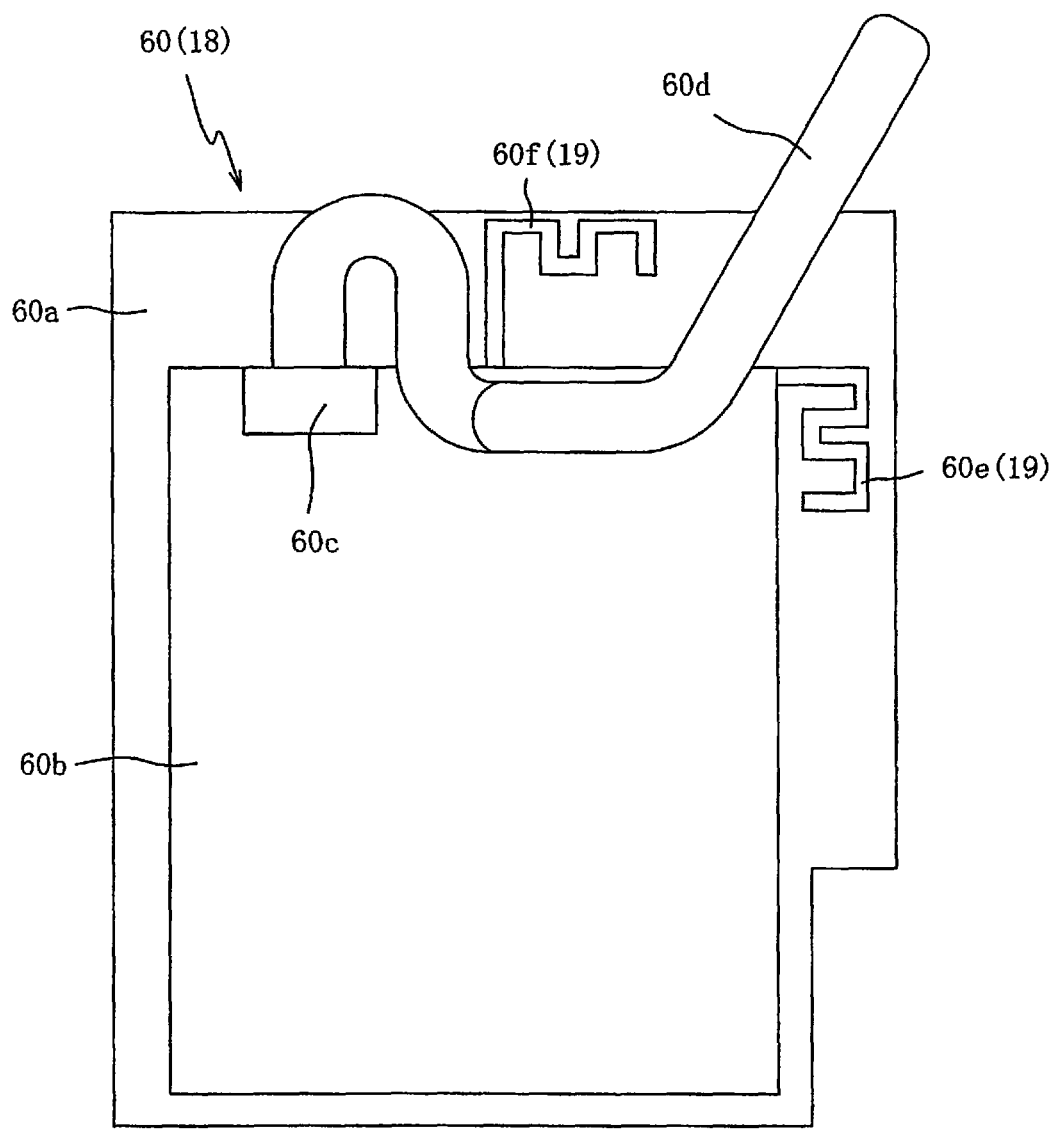
FIG. 2 is a front elevational view of a wireless LAN board of the communication apparatus.

FIG. 2 is a front elevational view of the wireless LAN board 60 including the wireless LAN communication control portion 18. As shown in FIG. 2, the wireless LAN board 60 is constructed such that a circuit module 60b is mounted on a surface of a glass epoxy substrate 60a with a connector 60c disposed at a portion of the circuit module 60b. A harness 60d for wiring is detachably connected with the connector 60c.

As shown in FIG. 2, a main antenna portion 60e and a sub antenna portion 60f are formed on the surface of the substrate 60a and in the vicinity of the circuit module 60b. The main antenna portion 60e is disposed at a lateral side of the circuit module 60b, and the sub antenna portion 60f is disposed at an upper side of the circuit module 60b. The main and sub antenna portions 60e and 60f cooperate to constitute a wireless LAN antenna 19 (shown in FIG. 3), by means of which the wireless LAN communication control portion 18 and the access point 62 are wirelessly connected to each other.

Main sources of noise are a power source board (not shown) and the communication board including the first digital-cordless-communication control portion 26. The first cordless-phone antenna 27 (i.e., an antenna for the telephone system) is connected with the communication board including the first digital-cordless-communication control portion 26. Since the first cordless-phone antenna 27 is adapted to communications using intense radio waves, the first cordless-phone antenna 27 can be a high noise source particularly.

According to the MFP 1, however, the wireless LAN board 60 is disposed at the front left corner 2A of the main housing 2, and the communication board including the first digital-cordless-communication control portion 26 is disposed at the opposing corner, i.e., the rear right corner 2B of the main housing 2. Thus, inside a single housing, namely, the main housing 2, of the MFP 1, the wireless LAN board 60 is positionally separated as much as possible from the communication board including the first digital-cordless-communication control portion 26, in order that an operation of the wireless LAN board 60 does not tend to be adversely affected by an operation of the communication board including the first digital-cordless-communication control portion 26. This arrangement is employed as an effective countermeasure to noise.

Figure 3:
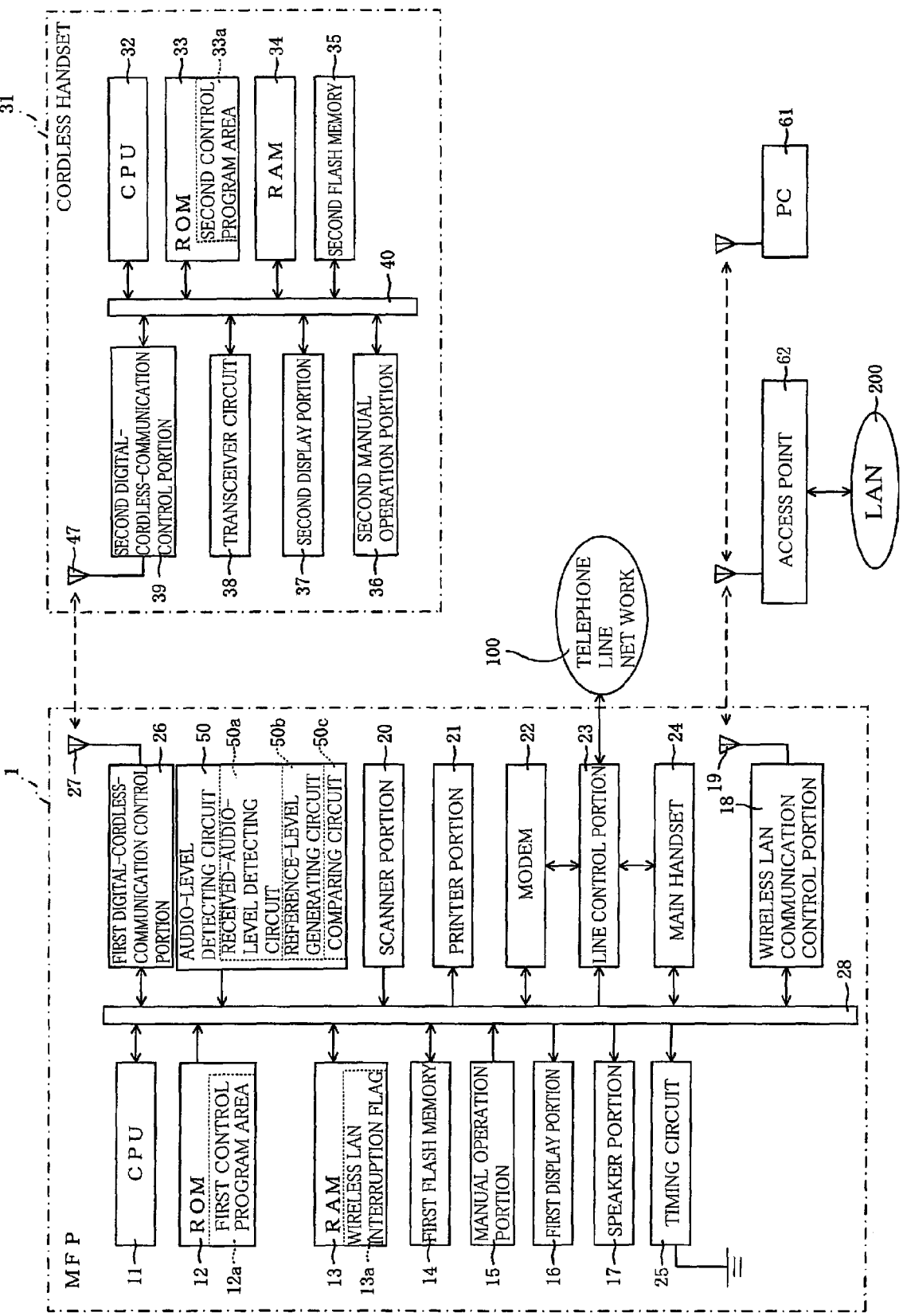
FIG. 3 is a block diagram illustrating an electrical structure of the MFP and a cordless handset.

Referring next to FIG. 3, which is a block diagram illustrating an electrical structure of the MFP 1 and the cordless handset 31. The cordless handset 31 is a communication apparatus according to an embodiment of the invention, similarly to the MFP 1. Further, the MFP 1 and the cordless handset 31 cooperate to constitute a communication system according to an embodiment of the invention.

As shown in FIG. 3, the MFP 1 mainly includes a first CPU 11, a first ROM 12, a first RAM 13, a first flash memory 14, the first manual operation portion 15, the first display portion 16, a speaker portion 17, the wireless LAN communication control portion 18, the wireless LAN antenna 19, the scanner portion 20, the printer portion 21, a modem 22, a line control portion 23, the base handset 24, a timing circuit 25, and the first digital-cordless-communication control portion 26. These members 11-26 are connected with one another through a first bus line 28.

The first CPU 11 is an arithmetic unit that controls the members connected with one another via the first bus line 28, in accordance with fixed values and programs stored in the first ROM 12, the first RAM 13, and the first flash memory 14, or in accordance with various kinds of signals communicated through the wireless LAN communication control portion 18, the line control portion 23, and the first digital-cordless-communication control portion 26.

The first ROM 12 is a memory not rewritable and includes a first control program area 12a where various kinds of control programs executed in the MFP 1 are stored. The control programs stored in the first control program area 12a include programs for implementing processings illustrated in FIGS. 4 and 6A and described later.

The first RAM 13 is a rewritable memory in which various kinds of data are temporarily stored. The first RAM 13 includes a wireless LAN interruption flag 13a, the value of which indicates whether a wireless communication (described later) is implemented by the wireless LAN communication control portion 18 or not. That is, when the value of the wireless LAN interruption flag 13a is "ON", a wireless communication through a LAN is not implemented by the wireless LAN communication control portion 18, and when the value of the wireless LAN interruption flag 13a is "OFF", such a wireless communication is implemented.

The value of the wireless LAN interruption flag 13a is switched between "ON" and "OFF" in the following manner, while the first digital-cordless-communication control portion 26 operates to make a wireless communication with the cordless handset 31 as described later. That is, an audio-level detecting circuit 50 (described later) detects a sound volume of audio data sent from the cordless handset 31, and when the thus detected sound volume is equal to or higher than a predetermined threshold, the wireless LAN interruption flag 13a is set to "ON" and the wireless LAN communication control portion 18 does not implement a wireless communication. On the other hand, when the detected sound volume is lower than the predetermined threshold, the wireless LAN interruption flag 13a is set to "OFF" and the wireless LAN communication control portion 18 implements a wireless communication.

In other words, when a user at or holding the cordless handset 31 is making sounds or speaking (which state will be referred to as "receiving state"), the wireless LAN communication control portion 18 does not implement, or interrupts, a wireless communication that the wireless LAN communication control portion 18 is implementing, and when the user holding the cordless handset 31 is not speaking, the wireless LAN communication control portion 18 implements, or continues, a wireless communication that the wireless LAN communication control portion 18 is implementing.

The first flash memory 14 is a rewritable non-volatile memory. Data stored in the first flash memory 14 is retained after the MFP 1 is turned off. The speaker portion 17 outputs various kinds of sounds depending on the situations to inform the user of the situations. For instance, the various kinds of sounds include an operation sound outputted when the first manual operation portion 15 is manipulated, an alarm sound outputted when an error occurs, and a ring alert outputted when a call is incoming.

The scanner portion 20 operates to read an image on a document sheet set on the document reading table 201. The first display portion 16 can present the image, and printable data of the image can be generated on the basis of which the printer portion 21 can record the image. The data of the image read by the scanner portion 20 is stored in a predetermined memory area in the first RAM 13 in a case where the MFP 1 is placed in one of facsimile mode, scanner mode, and copy mode. The printer portion 21 operates to record an image on a recording sheet supplied from the sheet supply cassette 211 on the basis of an instruction from the first CPU 11.

The modem 22 modulates data to be transmitted that is stored in the first RAM 13, into an image signal transmittable to the telephone line network 100, and sends the modulated data to the telephone line network 100 through the line control portion 23. The modem 22 also receives an image signal inputted from the telephone line network 100 through the line control portion 23, and demodulates the image signal into image data that can be presented on the first display portion 16 or recordable by the printer portion 21. The line control portion 23 is connected with the telephone line network 100, and operates to send a dial signal to the telephone line network 100 and respond to a ring signal from the telephone line network 100.

The base handset 24 is used for making a speech communication with the cordless handset 31 or an external apparatus (not shown) connected with the MFP 1 via the telephone line network 100. The base handset 24 has a microphone and a speaker (neither shown). The microphone converts a sound into audio data and outputs the audio data to the circuit control portion 23, and the speaker converts audio data inputted from the circuit control portion 23 into a sound and outputs the sound to the external space.

The base handset 24 is electrically connected to the line control portion 23 or the first digital-cordless-communication control portion 26 when the base handset 24 is pickup up or lifted off the support portion of the MFP 1, that is, when an "off-hook" operation is made. When the base handset 24 is replaced onto the support portion of the MFP 1, that is, when an "on-hook" operation is made, the base handset 24 is disconnected from the line control portion 23 or the first digital-cordless-communication control portion 26. The timing circuit 25 is a known circuit that has an internal clock representing the current time and calculates a time period by comparing a time at which a counting of time is commenced to the current time.

The first digital-cordless-communication control portion 26 constitutes a part of the communication board, and is connected with the first cordless-phone antenna 27. When the base handset 24 and the first digital-cordless-communication control portion 26 are connected to each other as a result of an off-hook operation of the base handset 24 or otherwise, the MFP 1 and the cordless handset 31 are wirelessly connected to each other.

In the present embodiment, the wireless communication between the MFP 1 and the cordless handset 31 is made by a FHSS (frequency-hopping spread spectrum) method using a plurality of frequency channels having respective center frequencies and defined within a frequency band of 2.4000-2.4835 GHz that is dedicated to digital cordless telephone according to communications standards.

When audio data is sent from the base handset 24 to the first digital-cordless-communication control portion 26, the audio data is converted into a digital signal and outputted or sent to the cordless handset 31. On the other hand, when a digital signal is received from the cordless handset 31, the digital signal is converted into audio data and outputted to the base handset 24.

The first digital-cordless-communication control portion 26 further includes a first frequency-hopping control portion (not shown) including a hopping pattern table, a hopping counter, and a clock, for implementing a wireless communication with the cordless handset 31 by the FHSS method.

The audio-level detecting circuit 50 detects a sound volume of audio data sent from the cordless handset 31 to the MFP 1, and outputs a sound-volume detection signal according to the detected sound volume. That is, when the detected sound volume is equal to or higher than the predetermined threshold, the audio-level detecting circuit 50 outputs a "Hi" signal. When the detected sound volume is lower than the threshold, the audio-level detecting circuit 50 outputs a "Low" signal.

The audio-level detecting circuit 50 includes a received-audio-level detecting circuit 50a, a reference-level generating circuit 50b, and a comparing circuit 50c. The received-audio-level detecting circuit 50a detects a sound volume of audio data sent from the cordless handset 31 to the MFP 1. The reference-level generating circuit 50b outputs a reference level of sound volume. The comparing circuit 50c compares the sound volume of audio data sent from the cordless handset 31 to the MFP 1, which is detected by the received-audio-level detecting circuit 50a, with the reference level generated by the reference-level generating circuit 50b. When the detected sound volume of the audio data sent from the cordless handset 31 is equal to or higher than the reference level, the comparing circuit 50c outputs a Hi signal. When the detected sound volume of the audio data sent from the cordless handset 31 is lower than the reference level, the comparing circuit 50c outputs a Low signal.

By means of the audio-level detecting circuit 50, whether the sound volume of the audio data sent from the cordless handset 31 to the MFP 1 is equal to or higher than the reference level or not is detectable. When the detected sound volume is equal to or higher than the reference level, it is determined that the receiving state is established, or that the user at or holding the cordless handset 31 is speaking and the MFP 1 is receiving from the cordless handset 31 audio data representative of the speech of the user at the cordless handset 31. In this case, the wireless LAN interruption flag 13a is set to "ON". Then, the wireless LAN communication control portion 18 does not implement the wireless communication, that is, the wireless communication being implemented by the wireless LAN communication control portion 18 is interrupted.

On the other hand, when the detected sound volume is lower than the reference level, it is determined that the receiving state is not established, or that the user at or holding the cordless handset 31 is not speaking, and the wireless LAN interruption flag 13a is set to "OFF". Then, the wireless LAN communication control portion 18 implements the wireless communication, that is, the wireless communication being implemented by the wireless LAN communication control portion 18 is continued.

The wireless LAN communication control portion 18 constitutes a part of the wireless LAN board 60, and is connected with the wireless LAN antenna 19 including the main antenna portion 60e and the sub antenna portion 60e. The wireless LAN communication control portion 18 is wirelessly connected with the access point 62 as a wireless LAN station through the wireless LAN antenna 19. Thus, the MFP 1 can make a data communication with a PC (Personal Computer) 61 as a wireless LAN apparatus connected with the access point 62.

The wireless LAN communication control portion 18 is wirelessly connected with the access point 62 via the wireless LAN antenna 19, and with a LAN 200 via the access point 62.

Thus, the MFP 1 is capable of data communication with an external apparatus (not shown) connected with the LAN 200.

The access point 62 is a known wireless LAN device as a communication device and wirelessly connected with a plurality of wireless LAN apparatuses such as the MFP 1 and the PC 61, so as to function as a relay device for connecting the wireless LAN apparatuses to the LAN 200.

On the other hand, as shown in FIG. 3, the cordless handset 31 is mainly constituted by a second CPU 32, a second ROM 33, a second RAM 34, and a second flash memory 35, a second manual operation portion 36, a second display portion 37, a transceiver circuit 38, and a second digital-cordless-communication control portion 39. These members 32-39 are connected with one another through a second bus line 40.

The second CPU 32 is an arithmetic unit that controls the members connected with one another via the second bus line 40, in accordance with fixed values and programs stored in the second ROM 33, the second RAM 34, and the second flash memory 35, or in accordance with various kinds of signals communicated through the wireless LAN communication control portion 39.

The second ROM 33 is a memory not rewritable and includes a second control program area 33a where various kinds of control programs executed in the cordless handset 31 are stored. The second RAM 34 is a rewritable memory for temporarily storing various kinds of data.

The second flash memory 35 is a rewritable non-volatile memory. Data stored in the second flash memory 35 is retained after the cordless handset 31 is turned off. The second manual operation portion 36 is manipulated when the user inputs an instruction related to management of the cordless handset 31, and when a speech communication is made between the cordless handset 31 and the MFP 1 or an external apparatus (not shown) connected to the cordless handset 31 via the MFP 1 and the telephone line network 100. The second manual operation portion 36 has numerical buttons (or a numeric keypad), a communication start button, a function button, and others. The second display portion 37 operates, when a manipulation to manage the cordless handset 31 is made, and when a speech communication between the cordless handset 31 and the MFP 1 or an external apparatus is made, to present a telephone number inputted through the second manipulation portion 36, and various kinds of information during a speech communication. For instance, the second display portion 37 is constituted by a display device such as LCD.

The transceiver circuit 38 is a device for enabling a speech communication between the cordless handset 31 and the MFP 1 or an external apparatus (not shown) connected to the cordless handset 31 via the telephone line network 100. The transceiver circuit 38 is connected with a microphone and a speaker (neither shown). The microphone converts a sound into audio data and inputs the audio data to the transceiver circuit 38. The speaker converts the audio data inputted from the transceiver circuit 38 into a sound and outputs the sound to the external space. The speaker also outputs various kinds of sounds corresponding to the situations to inform the user of the situations. For instance, the various kinds of sounds include an operation sound outputted when the second manual operation portion 36 is manipulated, an alarm sound outputted when an error occurs, and a ring alert outputted when a call is incoming.

The transceiver circuit 38 is connected to the second digital-cordless-communication control portion 39 when the user manipulates the second manual operation portion 36 in order to start a speech communication. The transceiver circuit 38 is disconnected from the second digital-cordless-communication control portion 39 when the user manipulates the second manual operation portion 36 in order to terminate the speech communication.

With the second digital-cordless-communication control portion 39, a second cordless-phone antenna 47 (i.e., an antenna for the telephone system) is connected. When the transceiver circuit 38 and the second digital-cordless-communication control portion 39 are connected to each other by the manipulation of the second manual operation portion 36 to start a speech communication, or by other means, a wireless communication is established between the cordless handset 31 and the MFP 1. The wireless communication is established between the cordless handset 31 and the MFP 1 by the FHSS method as described above.

When audio data is sent to the second digital-cordless-communication control portion 39 from the transceiver circuit 38, the second digital-cordless-communication control portion 39 converts the audio data into a digital signal for wireless communication, which is sent out or outputted to the MFP 1. On the other hand, when a digital signal for wireless communication as sent from the MFP 1 is received by the second digital-cordless-communication control portion 39, the second digital-cordless-communication control portion 39 converts the digital signal into an audio data, which is outputted to the transceiver circuit 38.

The second digital-cordless-communication control portion 39 includes a second frequency-hopping control portion (not shown) including a hopping pattern table, a hopping counter, and a clock, for implementing a wireless communication with the MFP 1 by the FHSS method.

Figure 4:
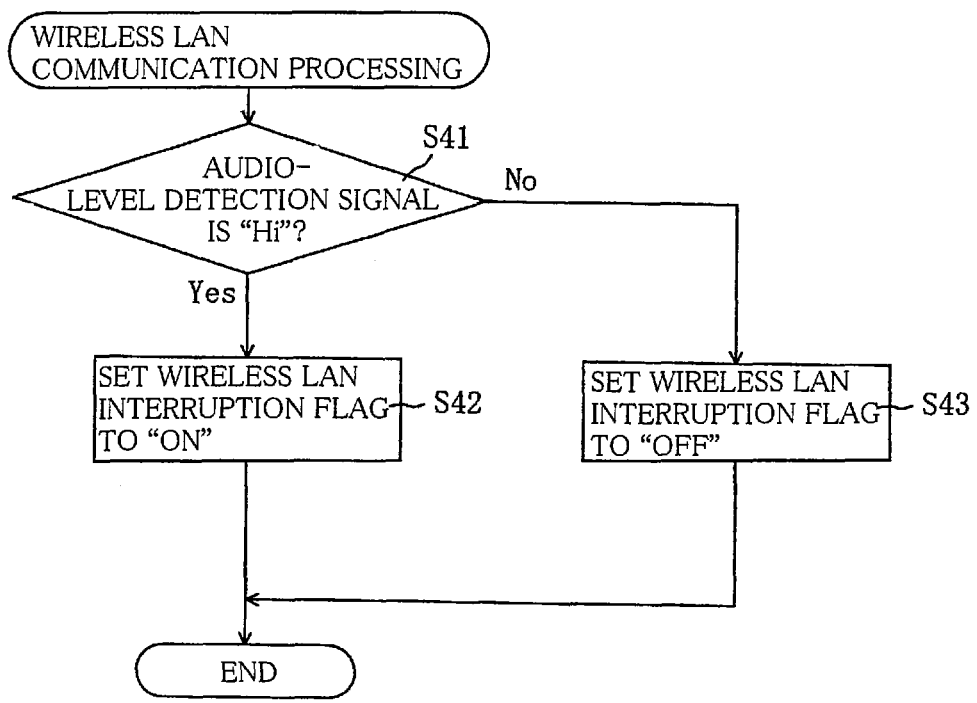
FIG. 4 is a flowchart illustrating a wireless LAN control processing according to the first embodiment.

FIG. 4 is a flowchart illustrating a wireless LAN control processing implemented in the MFP 1. In the wireless LAN control processing, the value of the wireless LAN interruption flag 13*a* which indicates whether the wireless LAN communication control portion 18 is to be operated to implement a wireless communication or not is set to one of "ON" and "OFF". The wireless LAN control processing is repeatedly implemented at constant time intervals (e.g., 10 ms) after the MFP 1 is turned on.

The wireless LAN control processing starts with step S41 in which it is determined whether a sound-volume detection signal outputted from the audio-level detecting circuit 50 is "Hi". That is, the audio-level detecting circuit 50 detects the sound volume of audio data sent from the cordless handset 31 to the MFP 1, and outputs a Hi signal when the detected sound volume is equal to or higher than the reference level, and outputs a Low signal when the detected sound volume is lower than the reference level. That is, in step S41, it is determined whether the receiving state is established, or whether the user holding the cordless handset 31 is speaking.

When the outputted sound-volume detection signal is Hi, an affirmative decision (YES) is made in step S41 and the processing flow goes to step S42 in which the wireless LAN interruption flag 13*a* is set to "ON". On the other hand, when the outputted sound-volume detection signal is Low, a negative decision (NO) is made in step S41 and the processing flow goes to step S43 in which the wireless LAN interruption flag 13*a* is set to "OFF", and the wireless LAN control processing of the current cycle is terminated.

By this processing, the wireless LAN interruption flag 13*a* can be set to one of "ON" and "OFF" depending on whether the receiving state, where the user at or holding the cordless handset 31 is speaking and the MFP 1 is receiving from the cordless handset 31 audio data representative of the speech of the user at the cordless handset 31, is established or not.

Figure 5:
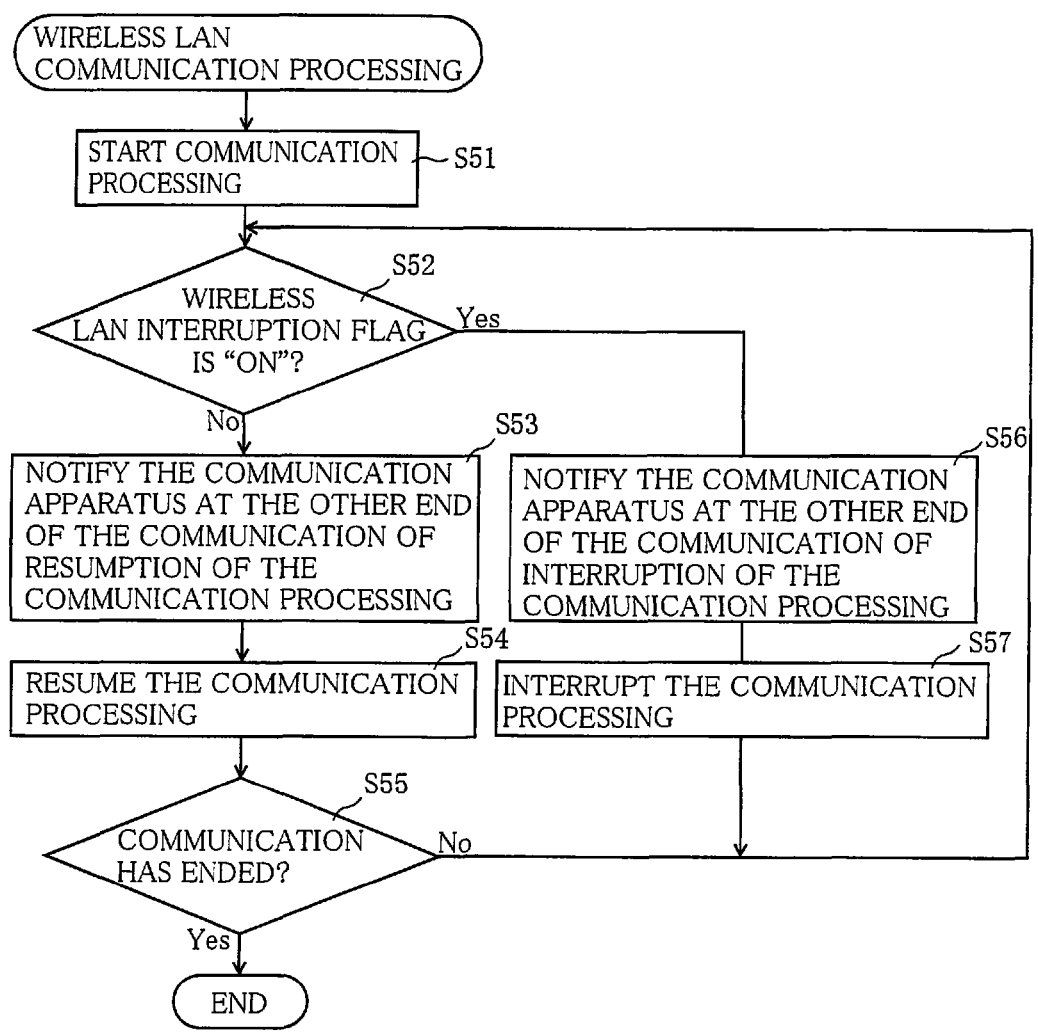
FIG. 5 is a flowchart illustrating a wireless LAN communication processing according to the first embodiment.

FIG. 5 is a flowchart illustrating a wireless LAN communication processing implemented in the MFP 1. The wireless LAN communication processing is implemented mainly by the wireless LAN communication control portion 18. The wireless LAN communication processing is initiated when the PC 61 sends the MFP 1 a request for initiation of a communication, in response to a request for connection sent from the FMP 1, or when the MFP 1 sends the PC 61 a request for initiation of a communication in response to a request for connection sent from the PC 61.

The wireless LAN communication processing starts with step S51 in which a communication processing is initiated, that is, initial settings for a wireless LAN communication are made and it is started that data to be sent to the PC 61 is sequentially recorded in a transmission buffer (not shown) included in the first RAM 13, as well as that data received from the PC 61 is sequentially recorded in a reception buffer (not shown) included in the first RAM 13.

Then, the processing flow goes to step S52 in which it is determined whether the wireless LAN interruption flag 13*a* is "ON", that is, whether the receiving state where the user holding the cordless handset 31 is speaking is established. When the wireless LAN interruption flag 13*a* is ON, an affirmative decision (YES) is made in step S52 and the processing flow goes to step S56 to notify the PC 61, as a communication apparatus at the other end of the communication, of an interruption of the communication processing of the current cycle, and then goes to step S57 to interrupt the communication processing. The processing flow then returns to step S52.

On the other hand, when it is determined in step S52 that the wireless LAN interruption flag 13*a* is OFF, that is, the receiving state where the user holding the cordless handset 31 is speaking is not established, and a negative decision (NO) is made in step S52, the processing flow goes to step S53 to notify the PC 61 of a resumption or a continuation of the communication processing, and then goes to step S54 to resume or continue the communication processing.

In the following step S55, it is determined whether the communication with the PC 61 is terminated. When the communication with the PC 61 is terminated, an affirmative decision (YES) is made in step S55 and the wireless LAN communication processing of this cycle is terminated. On the other hand, when the communication with the PC 61 is not terminated, a negative decision (NO) is made in step S55 and the processing flow returns to step S52 to repeat step S52 and the following steps.

By the wireless LAN communication processing, the wireless LAN communication is interrupted when the wireless LAN interruption flag 13*a* is "ON", i.e., when the receiving state where the user holding the cordless handset 31 is speaking is established, and the wireless LAN communication is continued when the wireless LAN interruption flag 13*a* is "OFF", i.e., when the receiving state where the user holding the cordless handset 31 is speaking is not established.

Thus, it is enabled to maintain an excellent quality of the speech communication wirelessly made between the first digital-cordless-communication control portion 26 and the cordless handset 31, while ensuring a communication time for the wireless communication between the wireless LAN communication control portion 18 and the PC 61.

Figure 11:
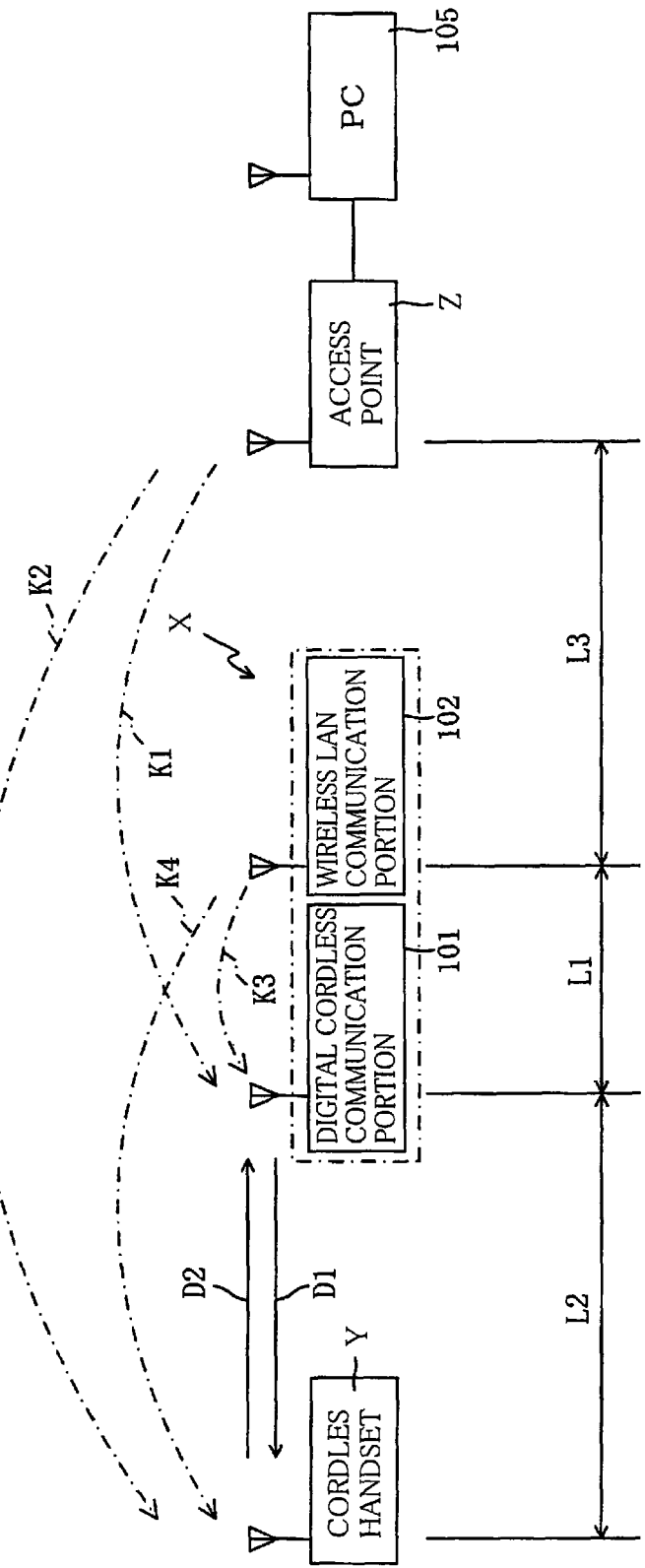
FIG. 11 schematically illustrates a wireless communication environment of a communication apparatus of the related art.

As described above with reference to FIG. 11, the first digital-cordless-communication control portion 26 and the wireless LAN communication control portion 18 are disposed in the same housing, and thus the distance therebetween is smaller than that between the cordless handset 31 and the wireless LAN communication control portion 18. Hence, when the first digital-cordless-communication control portion 26 and the cordless handset 31 are wirelessly communicating audio data to each other, a communication in a direction from the cordless handset 31 to the first digital-cordless-communication control portion 26 is more seriously subjected to a radio interference from the wireless LAN communication control portion 18 than a communication in the opposite direction, i.e., from the first digital-cordless-communication control portion 26 to the cordless handset 31, is, thereby degrading the quality of the communication from the cordless handset 31 to the first digital-cordless-communication control portion 26.

According to this embodiment, however, in the receiving state where the user holding the cordless handset 31 is speaking or where audio data is sent from the cordless handset 31 to the first digital-cordless-communication control portion 26, the wireless communication implemented by the wireless LAN communication control portion 18 is interrupted in order to inhibit the radio interference affecting the communication implemented by the first digital-cordless-communication control portion 26, thereby maintaining the excellent quality of the communication implemented by the first digital-cordless-communication control portion 26.

On the other hand, in the state where the user holding the cordless handset 31 is not speaking or where audio data is not sent from the cordless handset 31 to the first digital-cordless-communication control portion 26, the radio interference from the wireless LAN communication control portion 18 less affects the communication implemented by the first digital-cordless-communication control portion 26, and thus the wireless communication by the wireless LAN communication control portion 18 is not interrupted, thereby ensuring a communication time for the wireless communication implemented by the wireless LAN communication control portion 18.

As apparent from the above description, in the present embodiment, the wireless communication unit 81 constitutes a first communication portion, and the wireless LAN board 60 constitutes a second communication portion. The received-audio-level detecting circuit 50*a*, the reference-level generating circuit 50*b*, the comparing circuit 50*c*, and a portion of the first CPU 11, the first ROM 12, and the first RAM 13 that implements steps S41-S43 cooperate to constitute a speech detecting portion. The received-audio-level detecting circuit 50*a* constitutes a received-audio-level detecting portion. A portion of the first CPU 11, the first ROM 12, and the first RAM 13 that implements steps S51-S55 constitutes a communication control portion. A portion of the first CPU 11, the first ROM 12, and the first RAM 13 that implements steps S52-S54 constitutes a communication resuming portion.

Figure 6:
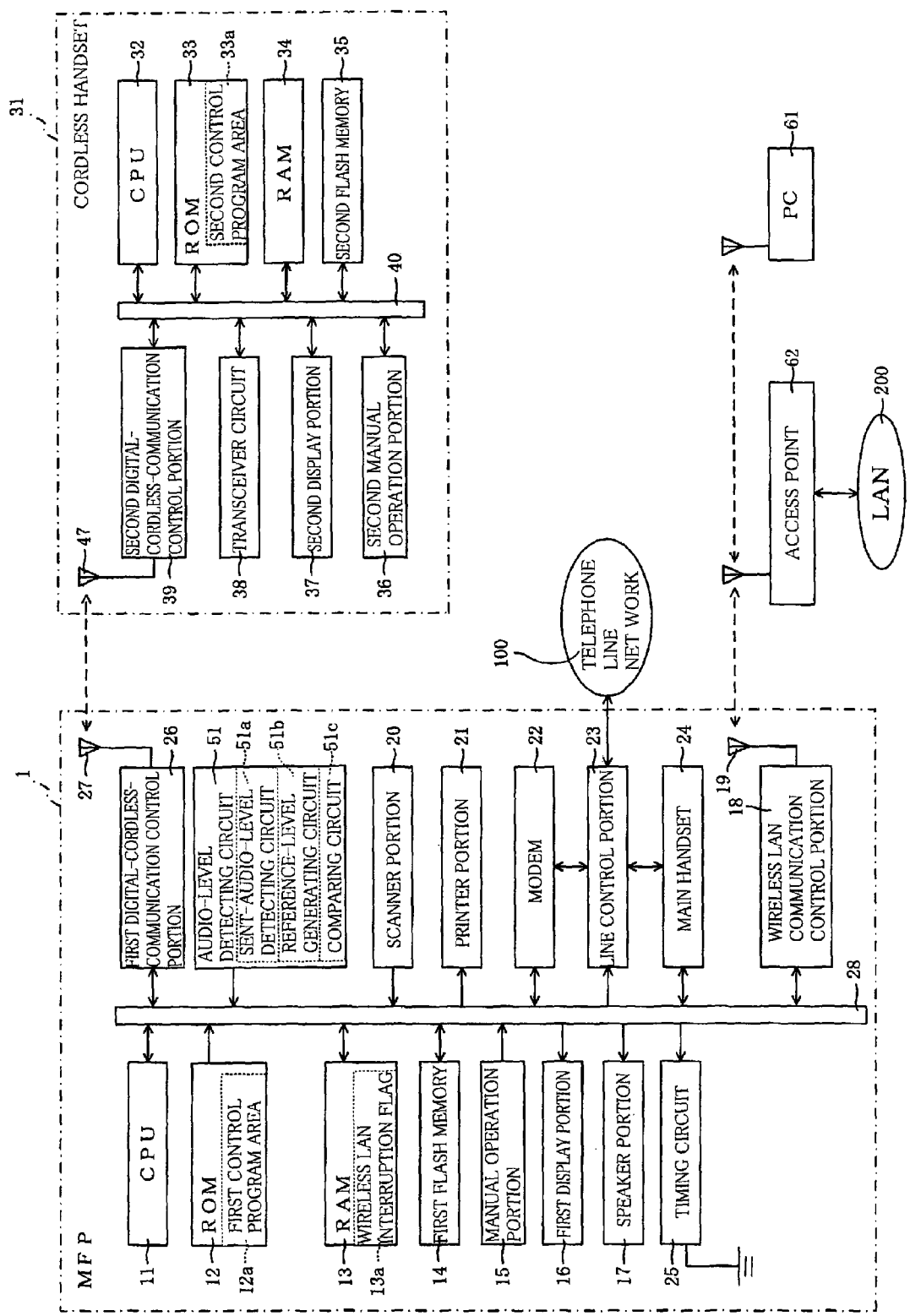
FIG. 6 is a block diagram illustrating an electrical structure of a MFP and a cordless handset according to a second embodiment of the invention.
Figure 7:
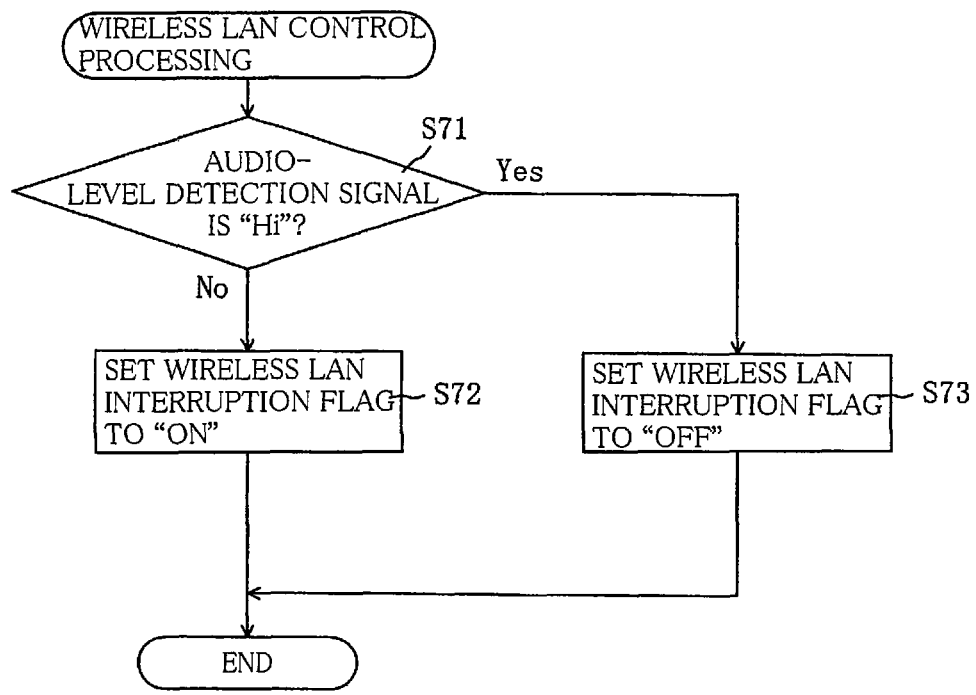
FIG. 7 is a flowchart illustrating a wireless LAN control processing according to the second embodiment.

There will be now described a second embodiment of the invention, with reference to FIGS. 6 and 7, in which FIG. 6 is a block diagram corresponding to FIG. 3 and showing an electrical structure of a MFP 1 and a cordless handset 31 according to the second embodiment. It is noted that elements or parts in the second embodiment that correspond to those in the first embodiment are denoted by the same reference numerals as used in the first embodiment and description thereof is dispensed with.

The second embodiment differs from the first embodiment in that a sound volume of audio data sent from the first digital-cordless-communication control portion 26 to the cordless handset 31 is detected and implementation (or continuation) and interruption of the wireless communication by the wireless LAN communication control portion 18 is controlled on the basis of the detected sound volume of the audio data sent from the first digital-cordless-communication control portion 26 to the cordless handset 31.

In the second embodiment, an audio-level detecting circuit 51 is provided in place of the audio-level detecting circuit 50. The audio-level detecting circuit 51 includes a sent-audio-level detecting circuit 51*a*, a reference-level generating circuit 51*b*, and a comparing circuit 51*c*.

The sent-audio-level detecting circuit 51*a* detects a sound volume of audio data sent from the MFP 1 to the cordless handset 31. The reference-level generating circuit 51*b* outputs a reference level of sound volume of audio data. The comparing circuit 51*c* compares the sound volume of the audio data sent from the MFP 1 to the cordless handset 31, which is detected by the sent-audio-level detecting circuit 51*a*, with the reference level generated by the reference-level generating circuit 51*b*. When the sound volume of the audio data sent from the MFP 1 is equal to or higher than the reference level, the comparing circuit 51*c* outputs a Hi signal. When the sound volume of the audio data sent from the MFP 1 is lower than the reference level, the comparing circuit 51*c* outputs a Low signal.

By means of the audio-level detecting circuit 51, whether the sound volume of the audio data sent from the MFP 1 to the cordless handset 31 is equal to or higher than the reference level or not is detectable. When the detected sound volume is equal to or higher than the reference level, it is determined that a receiving state where a user holding the cordless handset 31 is speaking is not established, and a wireless LAN interruption flag 13*a* is set to "OFF". Then, a wireless communication being implemented by a wireless LAN communication control portion 18 is not interrupted, but is continued or resumed.

On the other hand, when the detected sound volume is lower than the reference level, it is determined that the receiving state is established, or that the user holding the cordless handset 31 is speaking, and the wireless LAN interruption flag 13*a* is set to "ON". Then, the wireless communication being implemented by the wireless LAN communication control portion 18 is interrupted.

FIG. 7 is a flowchart corresponding to FIG. 4 and illustrating a wireless LAN control processing implemented in the MFP 1 according to the second embodiment. In the wireless LAN control processing, the value of the wireless LAN interruption flag 13*a* which indicates whether the wireless LAN communication control portion 18 is to be operated to implement a wireless communication or not is set to one of "ON" and "OFF". The wireless LAN control processing is repeatedly implemented at constant time intervals (e.g., 10 ms) after the MFP 1 is turned on.

The wireless LAN control processing starts with step S71 in which it is determined whether a sound-volume detection signal outputted from the audio-level detecting circuit 51 is "Hi". That is, the audio-level detecting circuit 51 detects the sound volume of audio data sent from the MFP 1 to the cordless handset 31, and outputs a Hi signal when the detected sound volume is equal to or higher than the reference level, and outputs a Low signal when the detected sound volume is lower than the reference level. That is, in step S71, it is determined whether the receiving state where the user holding the cordless handset 31 is speaking is established.

When the outputted sound-volume detection signal is Hi, an affirmative decision (YES) is made in step S71 and the processing flow goes to step S73 in which the wireless LAN interruption flag 13*a* is set to "OFF". On the other hand, when the outputted sound-volume detection signal is Low, a negative decision (NO) is made in step S71 and the processing flow goes to step S72 in which the wireless LAN interruption flag 13*a* is set to "ON", and the wireless LAN control processing of the current cycle is terminated.

By this processing, the wireless LAN interruption flag 13*a* can be set to one of "ON" and "OFF" depending on whether the receiving state is established or not, that is, whether the user of the cordless handset 31 is speaking or not. Thereafter, when the wireless LAN communication control portion 18 implements a wireless communication with a PC 61, the wireless communication is interrupted in the case where the wireless LAN interruption flag 13*a* is "ON", and the wireless communication is resumed or continued in the case where the wireless LAN interruption flag 13*a* is "OFF", in the same way as described above with respect to the first embodiment.

According to the second embodiment, whether the user holding the cordless handset 31 is speaking or not is determined on the basis of the sound volume of the audio data sent from the MFP 1 to the cordless handset 31 which sound volume is detected by the audio-level detecting circuit 51. That is, when the detected sound volume is equal to or higher than the reference level, it is determined that the receiving state is not established, that is, the user holding or at the cordless handset 31 is not speaking, and thus the wireless communication being implemented by the wireless LAN communication control portion 18 is not interrupted. On the other hand, when the detected sound volume is lower than the reference level, it is determined that the receiving state is established and thus the wireless communication being implemented by the wireless LAN communication control portion 18 is interrupted.

Thus, even when the receiving state where the user holding the cordless handset 31 is speaking is established, as long as it is detected that the sound volume of the audio data sent from the MFP 1 to the cordless handset 31 is equal to or higher than the reference level, a user at the MFP 1 who is communicating with the user holding the cordless handset 31 is also making sounds or speaking and it can be considered that at this moment the user at the MFP 1 does not intend to listen to the speech of the user at or holding the cordless handset 31. In this case, even when the user at the MFP 1 can not clearly hear the speech of the user holding the cordless handset 31 due to the radio interference from the wireless LAN communication control portion 18, it can be considered that the speech communication between the users is not seriously affected thereby. Hence, in such a case the wireless communication by the wireless LAN communication control portion 18 is not interrupted, thereby increasing the communication time for the wireless communication by the wireless LAN communication control portion 18.

As apparent from the above description, in the second embodiment, a wireless communication unit 81 constitutes a first communication portion, and a wireless LAN board 60 constitutes a second communication portion. The sent-audio-level detecting circuit 51*a*, the reference-level generating circuit 51*b*, the comparing circuit 51*c*, and a portion of a first CPU 11, a first ROM 12, and a first RAM 13 that implements steps S51-S55 cooperate to constitute a communication control portion. A portion of the first CPU 11, the first ROM 12, and the first RAM 13 that implements steps S52-S54 constitutes a communication resuming portion.

Figure 8:
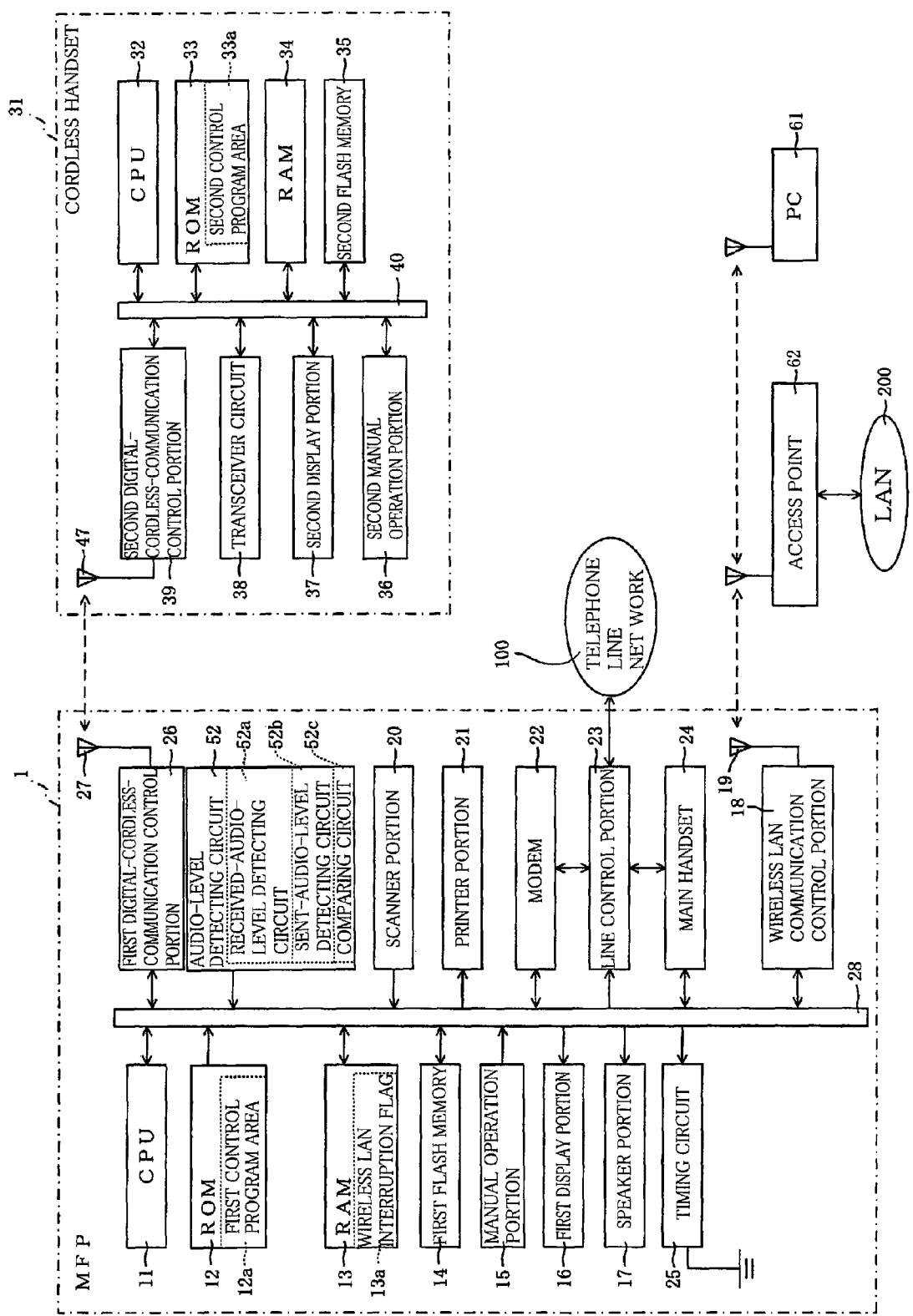
FIG. 8 is a block diagram illustrating an electrical structure of a MFP and a cordless handset according to a third embodiment of the invention.

There will be described a third embodiment of the invention, with reference to FIG. 8, which is a block diagram corresponding to FIG. 3 and showing an electrical structure of a MFP 1 and a cordless handset 31 according to the third embodiment. Elements and parts corresponding to those of the first embodiment are denoted by the same reference numerals as used in the first embodiment and description thereof is dispensed with.

In the third embodiment, an audio-level detecting circuit 52 is provided in place of the audio-level detecting circuit 50.

The audio-level detecting circuit 52 includes a received-audio-level detecting circuit 52*a*, a sent-audio-level detecting circuit 52*b*, and a comparing circuit 52*c*.

The received-audio-level detecting circuit 52*a* detects a sound volume of audio data sent from the cordless handset 31 to the MFP 1. The sent-audio-level detecting circuit 52*b* detects a sound volume of audio data sent from the MFP 1 to the cordless handset 31. The comparing circuit 52*c* compares the sound volume of the audio data sent from the cordless handset 31 to the MFP 1, which is detected by the received-audio-level detecting circuit 52*a*, with the sound volume of the audio data sent from the MFP 1 to the cordless handset 31, which is detected by the sent-audio-level detecting circuit 52*b*. When the detected sound volume of the audio data sent from the cordless handset 31 is equal to or higher than the detected sound volume of the audio data sent from the MFP 1, the comparing circuit 52*c* outputs a Hi signal. When the detected sound volume of the audio data sent from the cordless handset 31 is lower than the detected sound volume of the audio data sent from the MFP 1, the comparing circuit 52*c* outputs a Low signal.

By means of the audio-level detecting circuit 52, whether the sound volume of the audio data sent from the cordless handset 31 to the MFP 1 is equal to or higher than the sound volume of the audio data sent from the MFP 1 to the cordless handset 31 is detectable. When the detected sound volume of the audio data sent from the cordless handset 31 is equal to or higher than the detected sound volume of the audio data sent from the MFP 1, it is determined that a receiving state where a user holding the cordless handset 31 is speaking is established, and a wireless LAN interruption flag 13*a* is set to "ON". Then, a wireless communication being implemented by a wireless LAN communication control portion 18 is interrupted.

On the other hand, when the detected sound volume of the audio data sent from the cordless handset 31 is lower than the detected sound volume of the audio data sent from the MFP 1, it is determined that the receiving state where the user holding the cordless handset 31 is speaking is not established, and a wireless LAN interruption flag 13*a* is set to "OFF". Then, a wireless communication being implemented by a wireless LAN communication control portion 18 is not interrupted, but is continued or resumed.

A wireless LAN control processing and a wireless LAN communication processing implemented in the third embodiment are the same as those in the first embodiment and shown in FIGS. 4 and 5, and thus description thereof is dispensed with.

According to the third embodiment, whether the receiving state where the user holding the cordless handset 31 is speaking is established or not is detected by comparing the detected sound volume of the audio data sent from the cordless handset 31 with the detected sound volume of the audio data sent from the MFP 1. When the former is equal to or higher than the latter, it is determined that the receiving state is established, and the wireless communication by the wireless LAN communication control portion 18 is interrupted. On the other hand, when the former is lower than the latter, it is determined that the receiving state is not established, and the wireless communication by the wireless LAN communication control portion 18 is not interrupted, but is continued or resumed.

That is, when the sound volume of the audio data sent from the cordless handset 31 to the MFP 1 is equal to or higher than the sound volume of the audio data sent from the MFP 1 to the cordless handset 31, it is highly probable that the user at or holding the cordless handset 31 is speaking and the user at the MFP 1 is listening to the speech of the user at or holding the cordless handset 31. Hence, in such a case, the wireless communication by the wireless LAN communication control portion 18 is interrupted, thereby maintaining the excellent quality of the wireless communication by the first digital-cordless-communication control portion 26.

On the other hand, when the sound volume of the audio data sent from the cordless handset 31 to the MFP 1 is lower than the sound volume of the audio data sent from the MFP 1 to the cordless handset 31, it can be considered that the user at the MFP 1 does not intend to listen to the speech of the user at the cordless handset 31. In this case, even when the user at the MFP 1 can not clearly hear the speech of the user at the cordless handset 31 due to the radio interference from the wireless LAN communication control portion 18, it can be considered that the speech communication between the users is not seriously affected thereby. Hence, in such a case the wireless communication by the wireless LAN communication control portion 18 is not interrupted, but is continued or resumed, thereby increasing the communication time for the wireless communication by the wireless LAN communication control portion 18.

As apparent from the above description, in the third embodiment, a wireless communication unit 81 constitutes a first communication portion, and a wireless LAN board 60 constitutes a second communication portion. The received-audio-level detecting circuit 52a, the sent-audio-level detecting circuit 52b, the comparing circuit 52c, and a portion of a first CPU 11, a first ROM 12, and a first RAM 13 that implements steps S41-S43 cooperate to constitute a speech detecting portion. The received-audio-level detecting circuit 52a constitutes a received-audio-level detecting portion, the sent-audio-level detecting circuit 52b constitutes a sent-audio-level detecting portion, and the comparing circuit 52c constitutes a comparing portion. A portion of the first CPU 11, the first ROM 12, and the first RAM 13 that implements steps S51-S55 constitutes a communication control portion. A portion of the first CPU 11, the first ROM 12, and the first RAM 13 that implements steps S52-S54 constitutes a communication resuming portion.

There will be described a fourth embodiment of the invention, with reference to FIG. 9. Like in the above-described embodiments, in the fourth embodiment a sound volume of audio data sent from a cordless handset 31 to a MFP 1 and a sound volume of audio data sent from the MFP 1 to the cordless handset 31 are detected. In the fourth embodiment, however, these detections are made on the basis of sound volume information included in the audio data. In a digital cordless telephone system, sounds or a speech is transmitted from a transmitting side to the receiving side, by being converted sequentially into an analog audio signal, digital audio data, a wireless communication signal, digital audio data, an analog audio signal, and sounds or a speech that is received by the other user. The digital audio data includes the sound volume information, and information processing is implemented on the basis of the sound volume information so as to obtain the sound volume of the audio data sent from the cordless handset 31 to the MFP 1 and the sound volume of the audio data sent from the MFP 1 to the cordless handset 31. On the basis of the thus obtained sound volumes, it is detected that the user holding or at the cordless handset 31 is speaking.

Figure 9:
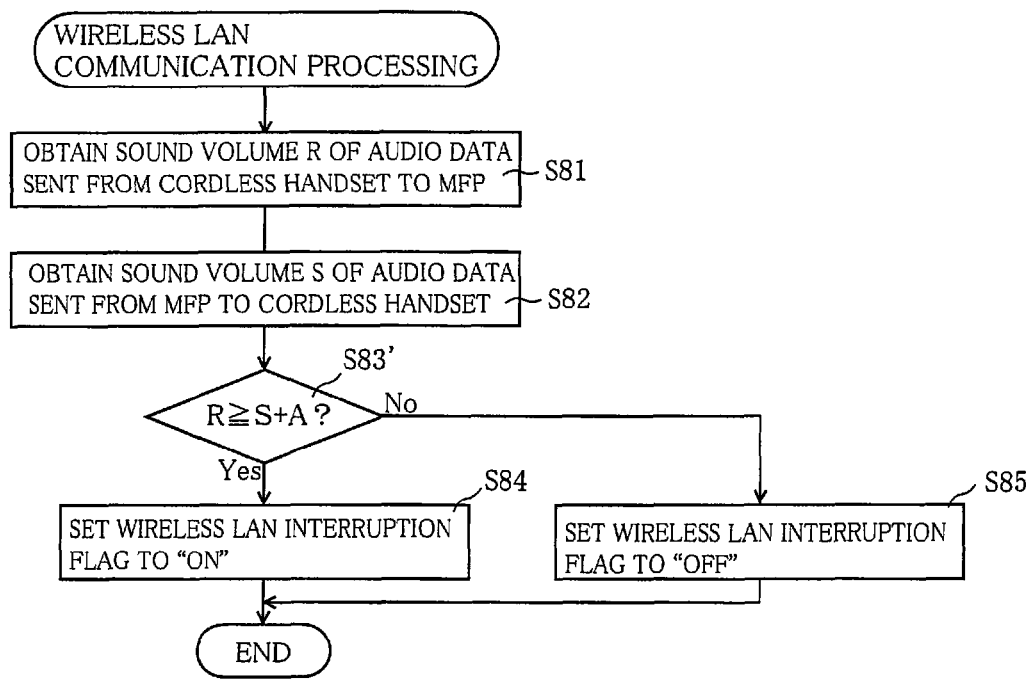
FIG. 9 is a flowchart illustrating a wireless LAN control processing according to a fourth embodiment.

FIG. 9 is a flowchart illustrating a wireless LAN control processing implemented for this purpose. The processing starts at step S81 in which a sound volume R of audio data sent from the cordless handset 31 to the MFP 1 is obtained. Then, the processing flow goes to step S82 in which a sound volume S of audio data sent from the MFP 1 to the cordless handset 31 is obtained. In the following step S83, it is determined whether the sound volume R of the audio data sent from the cordless handset 31 is equal to or higher than a sum of the sound volume S of the audio data sent from the MFP 1 and a predetermined amount A. When an affirmative decision (YES) is made in step S83, the processing flow goes to step S84 in which a wireless LAN interruption flag 13a is set to "ON". On the other hand, when a negative decision (NO) is made in step S83, the processing flow goes to step S85 in which the wireless LAN interruption flag 13a is set to "OFF". A wireless communication processing identical with that of the first embodiment, i.e., the processing illustrated in FIG. 5, is implemented thereafter.

Thus, according to the fourth embodiment, it is not determined that it is detected that the user at the cordless handset 31 is speaking when simply the sound volume of the audio data sent from the cordless handset 31 is equal to or higher than the sound volume of the audio data sent from the MFP 1, but is determined only when the sound volume of the audio data sent from the cordless handset 31 is larger than the sound volume of the audio data sent from the MFP 1 by the predetermined amount. In the present embodiment, a portion of a first CPU 11, a first ROM 12, and a first RAM 13 that implements steps S81-S85 constitutes a speech detecting portion. A portion of the first CPU 11, the first ROM 12, and the first RAM 13 that implements step S81 constitutes a received-audio-level detecting portion, and a portion of the first CPU 11, the first ROM 12, and the first RAM 13 that implements step S82 constitutes a sent-audio-level detecting portion.

Figure 10:
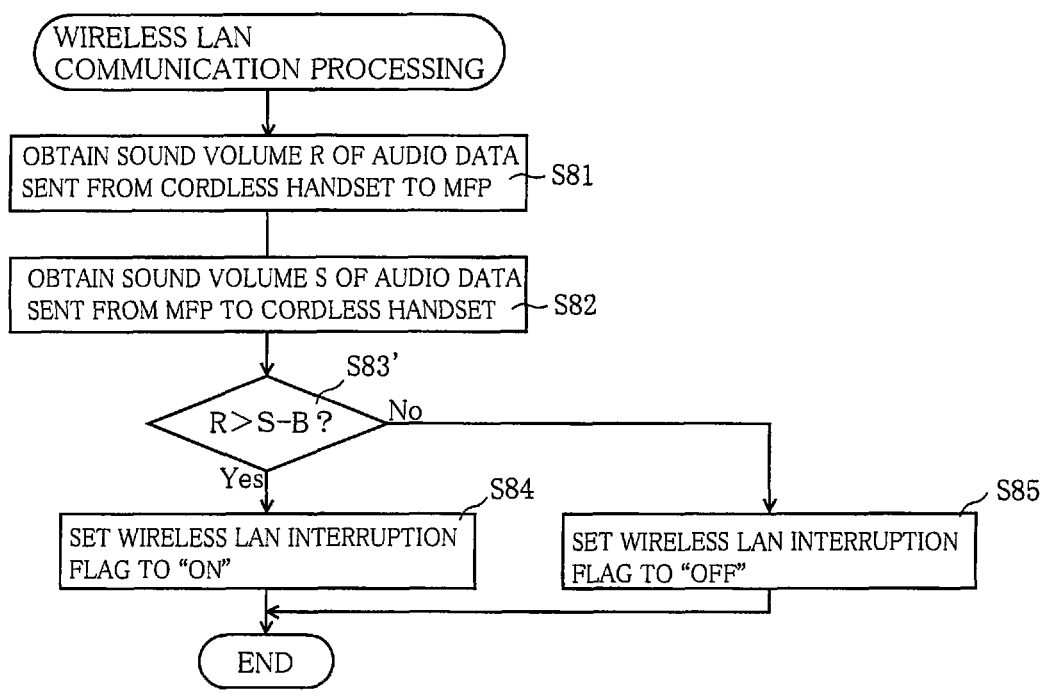
FIG. 10 is a flowchart illustrating a wireless LAN control processing according to a fifth embodiment.

There will be described a fifth embodiment of the invention, with reference to FIG. 10, which illustrates a wireless LAN control processing for detecting whether a user at or holding a cordless handset 31 is speaking. This flowchart differs from the corresponding flowchart of the fourth embodiment only in step S83'. That is, in step S83', it is determined whether a sound volume R of audio data sent from the cordless handset 31 to a MFP 1 is larger than a difference obtained by subtracting a predetermined amount B from the sound volume S of audio data sent from the MFP to the cordless handset 31. When an affirmative decision (YES) is obtained in step S83', the processing flow goes to step S84 to set a wireless LAN interruption flag 13a to "ON". On the other hand, when a negative decision (NO) is obtained in step S83', the processing flow goes to step S85 to set the wireless LAN interruption flag 13a to "OFF".

According to the fifth embodiment, it is determined that it is detected that a user at or holding the cordless handset 31 is speaking when the sound volume R of the audio data sent from the cordless handset 31 is larger than the sound volume S of the audio data sent from the MFP 1 by an amount larger than the predetermined amount B. In the fifth embodiment, a portion of a first CPU 11, a first ROM 12, and a first RAM 13 that implements steps S81, S82, S83', S84 and S85 constitutes a speech detecting portion. A portion of the first CPU 11, the first ROM 12, and the first RAM 13 that implements step S81 constitutes a received-audio-level detecting portion, and a portion of the first CPU 11, the first ROM 12, and the first RAM 13 that implements step S82 constitutes a sent-audio-level detecting portion.

Although there have been described presently preferred embodiments of the invention, it is to be understood that the invention is not limited to the details of the embodiments, but may be otherwise embodied with various modifications and improvements that may occur to those skilled in the art, without departing from the scope and spirit of the invention defined in the appended claims.

For instance, the sound volume of audio data is detected by the audio-level detecting circuit in the first to third embodiments, and is obtained on the basis of the sound volume information included in the audio data in the fourth and fifth embodiments. However, the first to third embodiments may be modified such that the sound volume of audio data is obtained on the basis of the sound volume information included in the audio data, and the fourth and fifth embodiments may be modified such that the sound volume of audio data is detected by an audio-level detecting circuit.

In the above-described embodiments, the MFP 1 includes the audio-level detecting circuit 50, 51, 52, or means for detecting the sound volume of audio data by software processing, and implements the wireless LAN control processing. However, the embodiments may be modified such that the audio-level detecting circuit 50, 51, 52 or the means for detecting the sound volume of audio data is included in the cordless handset 31, and the wireless LAN control processing is implemented in the cordless handset 31.

In the above-described embodiments, the base unit or MFP 1 and the cordless handset 31 of a digital cordless telephone system are described as communication apparatuses wirelessly communicating audio data, by way of example. However, the invention is applicable to a case where a radio apparatus such as transceiver is employed as a communication apparatus.

In each of the above-described embodiments, the wireless communication that may be interrupted is implemented by a base unit or a MFP 1 or a cordless handset 31 of a digital cordless telephone system for wirelessly communicating audio data. However, this technique is also applicable to a communication apparatus that makes a wireless communication using communication methods or technologies other than digital cordless telephone technology, e.g., wireless LAN technology.

Although in the above-described embodiments the access point 62 is used as a device communicating with the MFP 1 through a wireless LAN, other apparatuses or devices capable of a wireless communication through a LAN, e.g., a wireless LAN printer, may replace the access point 62.

What is claimed is:

1. A communication apparatus comprising:
a first antenna;
a first communication portion which wirelessly sends and receives first digital data to and from a first other communication apparatus by using a frequency channel within a frequency band via the first antenna, the first digital data comprising signal-level information that indicates a signal level of an analog signal converted from or into the first digital data;
a second antenna;
a second communication portion which wirelessly sends and receives second digital data to and from a second other communication apparatus by using a frequency channel within the frequency band via the second antenna;
a signal-level comparing portion which compares the signal level of the analog signal converted from or into the first digital data, sent to or received from the first other communication apparatus via the first antenna, with a predetermined signal level, the signal level of the analog signal representing an audio level of the analog signal; and
a communication controller which interrupts a wireless communication implemented via the second antenna when the signal level of the first digital data sent to or received from the first other communication apparatus via the first antenna is greater than or equal to the predetermined signal level as a result of comparison by the signal-level comparing portion, wherein the communication controller does not interrupt the wireless communication implemented via the second antenna when the signal level of the first digital data sent to or received from the first other communication apparatus via the first antenna is less than the predetermined signal level as the result of the comparison.

2. The communication apparatus according to claim 1, further comprising a communication resuming portion which resumes the wireless communication via the second antenna when the signal level of the analog signal becomes less than the predetermined signal-level after the interruption of the wireless communication.

3. A communication system comprising a base unit and a cordless handset at least one of which is constituted by the communication apparatus according to claim 1.

4. A communication apparatus comprising:
a first antenna;
a first communication portion which wirelessly sends and receives first digital data to and from a first other communication apparatus by using a frequency channel within a frequency band via the first antenna, the first digital data comprising first signal-level information that indicates a signal level of an analog signal converted from or into the first digital data;
a second antenna;
a second communication portion which wirelessly sends and receives second digital data to and from a second other communication apparatus by using a frequency channel within the frequency band via the second antenna;
a signal-level comparing portion which compares a first signal level of the analog signal converted from the first digital data, sent from the first other communication apparatus to the first communication portion via the first antenna, with a second signal level of the analog signal converted into the first digital data, sent from the first communication portion to the first other communication apparatus via the first antenna; and
a communication controller which interrupts a wireless communication implemented via the second antenna when the first signal level of the first digital data received from the first other communication apparatus via the first antenna is greater than or equal to the second signal level of the first digital data sent to the first other communication apparatus via the first antenna as a result of comparison by the signal-level comparison portion, wherein the communication controller does not interrupt the wireless communication implemented via the second antenna when the first signal level of the first digital data received from the first other communication apparatus via the first antenna is less than the second signal level of the first digital data sent to the first other communication apparatus via the first antenna as the result of the comparison.

* * * * *